United States Patent [19]

Burns et al.

[11] Patent Number: 4,834,606
[45] Date of Patent: May 30, 1989

[54] APPARATUS FOR STACKING FORMED ARTICLES

[75] Inventors: Thomas M. Burns, Royal Oak; David Ryan, Farmington, both of Mich.

[73] Assignee: Detroit Forming, Inc., Southfield, Mich.

[21] Appl. No.: 913,270

[22] Filed: Sep. 30, 1986

[51] Int. Cl.⁴ ............................................. B65G 57/30
[52] U.S. Cl. .................................. 414/795.3; 414/900; 414/901; 414/790
[58] Field of Search ....................... 414/30, 43, 92, 96, 414/900

[56] References Cited

U.S. PATENT DOCUMENTS

| | | | |
|---|---|---|---|
| 3,159,287 | 12/1964 | Stroup | 414/900 X |
| 3,330,423 | 7/1967 | Kirkhof | 414/96 X |
| 3,396,857 | 8/1968 | Brown | 414/900 X |
| 3,410,421 | 11/1968 | Groll | 414/900 X |
| 3,478,897 | 11/1969 | Dykeman | 414/900 X |
| 3,526,075 | 9/1970 | Mueller et al. | 53/447 |
| 3,659,728 | 5/1972 | Reinecke | 414/900 X |
| 3,712,186 | 1/1973 | Lulie et al. | 414/92 X |
| 3,750,900 | 8/1973 | Piercey | 414/30 |
| 3,771,670 | 11/1973 | Napoleone et al. | 414/96 |
| 4,456,235 | 6/1984 | Colglazier et al. | 271/3.1 |
| 4,522,617 | 6/1985 | Mowry | 493/126 |

FOREIGN PATENT DOCUMENTS

| | | | |
|---|---|---|---|
| 682369 | 2/1965 | Italy | 414/96 |
| 568583 | 8/1977 | U.S.S.R. | 414/96 |

*Primary Examiner*—Frank E. Werner
*Assistant Examiner*—Janice Krizek
*Attorney, Agent, or Firm*—Harness, Dickey & Pierce

[57] ABSTRACT

An improved stacking apparatus which is particularly well suited for receiving formed polymeric articles from appropriate forming apparatus and arranging these formed articles in stacked nested relationship with each stack containing a predetermined number of such articles so as to thereby facilitate accurate packaging of the formed articles for shipment. The stacking apparatus includes a plurality of independently controlled elevator and exit gating members which may be easily and readily positioned in various spaced relationships so as to enable the stacking apparatus to handle a wide variety of different sized formed articles. Because each of the elevator and gating members is independently actuable, the stacking apparatus is able to release individual nested stacks of formed articles containing the desired predetermined number without regard to whether or not adjacent stacks have received the same number of formed articles.

22 Claims, 6 Drawing Sheets

APPARATUS FOR STACKING FORMED ARTICLES

BACKGROUND OF THE INVENTION

The present invention relates generally to stacking apparatus and more specifically to such apparatus which is designed to receive flexible formed polymeric articles from forming means and to stack such articles in nested relationship with each such stack containing a predetermined number of the formed articles.

In packaging of various types of articles such as for example cookies, candies, and other various food products, it has become customary to utilize relatively thin, lightweight polymeric trays formed with a plurality of cavities into which the articles are placed either individually or in groups. These polymeric trays offer a relatively lightweight means by which the articles can be both maintained in the desired orientation and protected from damage during subsequent shipment and handling thereof.

These polymeric trays are generally formed from sheet material by use of a thermal vacuum forming operation. Typically the dies used in such forming machines will be provided with a plurality of cavities whereby a relatively large number of such trays may be substantially simultaneously formed during a single cycle of the forming apparatus. These thus formed articles are then moved outwardly from the forming machine and through a stripper operation wherein the interconnecting web remaining from the sheet material is stripped from the respective containers and the thus formed containers are ready for final packaging and shipment to the ultimate user thereof. Because the dies used in forming the polymeric trays contain a plurality of cavities, each cycle of the machine results in the discharge of a relatively large number of such articles which typically will be arranged in a plurality of substantially parallel rows with each row containing a plurality of trays.

Once the formed trays have been stripped from the interconnecting web, they must then be stacked in nested relationship and packaged for shipment to the ultimate customer. Previously it has been necessary to employ hand labor in order to stack and package accurate quantities of the thus formed trays for shipment to the customer. However, the use of manual labor for this operation is both relatively inefficient and costly. Accordingly, it has long been desired to develop automated apparatus which may accurately count and stack the formed trays so as to reduce the amount of manual labor required in this final packaging operation. However, while various attempts have been made to accomplish this objective, none have resulted in a completely satisfactory apparatus for performing this task in a rapid, efficient and cost effective manner.

It should also be noted that because of the wide variety of sizes and shapes of these polymeric trays being manufactured, it is necessary that any such stacking apparatus, in order to be truly cost effective, must be capable of being readily adjusted so as to handle such articles differing in both width and/or length. Further, it should be noted that the individual trays within each row are provided with varying positioned (from one tray to the next in each row) lugs or protrusions to limit the nesting movement thereof and to facilitate subsequent unstacking during filling. Hence, it is necessary that trays in each tray within a row be stacked in sequence in order to avoid possible nesting alignment of these protrusions. Additionally, because of the speed with which the forming operation is being accomplished and the nature of the polymeric trays themselves, it is often difficult to assure that a tray will be properly located for each and every row during each stacking cycle. Thus, it is highly desirable that any such stacking apparatus employ individual means for accurately counting the trays supplied to each individual stack and releasing the stack for final packaging upon accumulation of the desired predetermined number.

The present invention provides an improved stacking apparatus which accomplishes these varied and often conflicting objectives. The stacking apparatus of the present invention employs a plurality of panels which are designed to be positioned in side-by-side relationship and incorporate within each panel individually operable elevator means which operate to receive the respective formed articles and to raise the articles into a nested stacked relationship with previously received articles. Each of the respective panel members is also provided with exit gate means which are designed to be individually controlled in response to appropriate signals from counting means and to release the stacked articles upon accumulation of the desired predetermined number of articles therein. Suitable infeed guide means are also provided which incorporate readily adjustable elongated rail members which are designed to be easily and readily positioned in substantially any desired spaced relationship so as to thereby assure that a wide variety of differently sized articles may be easily handled. Further, the panel members incorporating the elevator members are also designed to be easily removed and reinstalled in different positions so as to enable quick and easy alteration of the apparatus for handling of different sized containers. Thus, the stacking apparatus of the present invention offers the ability to accommodate the wide and varied sizes of formed articles which may be fed thereto while also offering the ability to be easily and readily converted from one size to another thereby minimizing the amount of time required to accomplish the changeover.

Additional advantages and features of the present invention will become apparent from the subsequent description and the appended claims taken in conjunction with the accompanying drawings.

BRIEF DESCRIPTION OF THE DRAWINGS

FIG. 3 is an enlarged fragmentary view of the feed portion of the stacking apparatus illustrated in FIG. 1;

FIG. 4 is a fragmentary perspective view showing the entry gating arrangement forming a part of the stacking apparatus of FIG. 1;

DESCRIPTION OF THE PREFERRED EMBODIMENT

Figure 1:
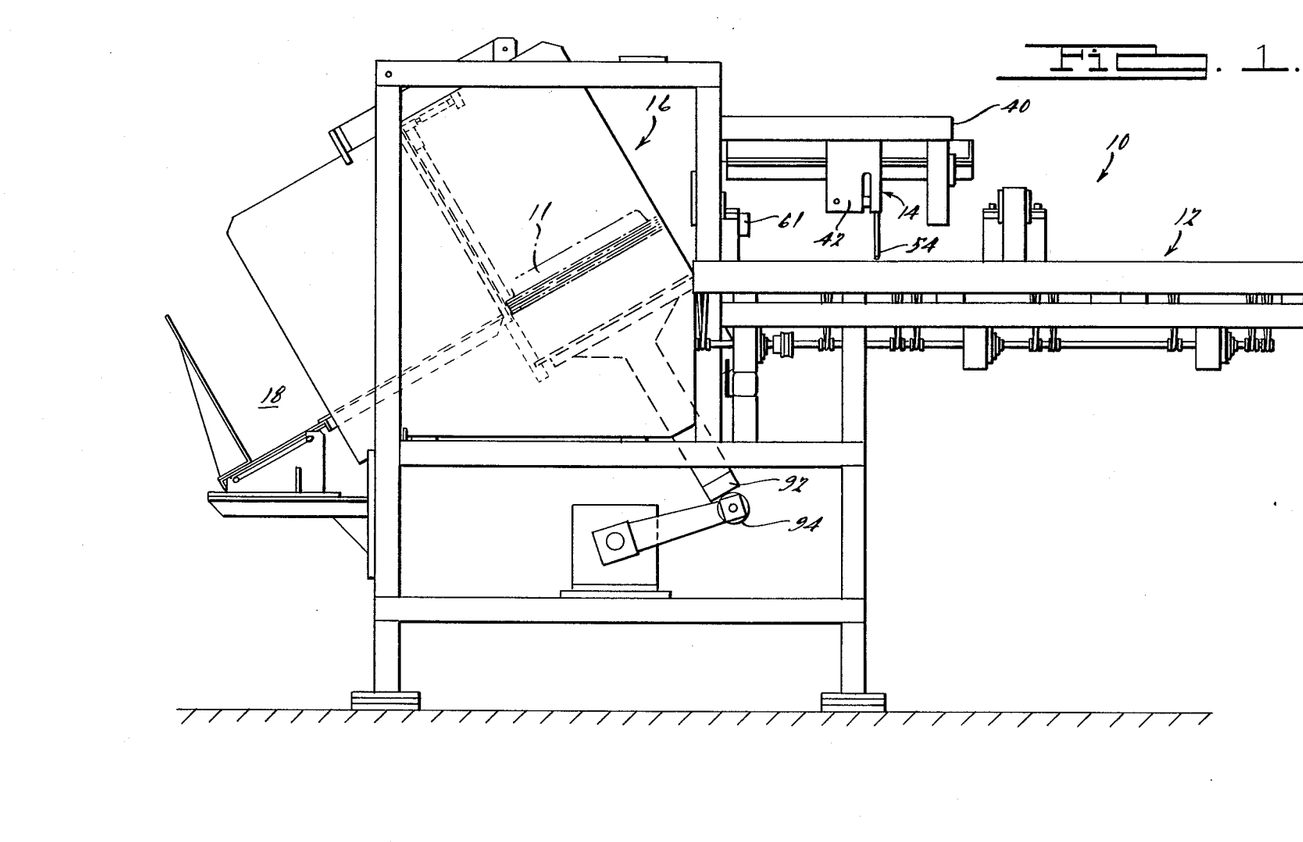
FIG. 1 is a side elevational view of the stacking apparatus in accordance with the present invention.

Referring now to the drawings and in particular to FIG. 1, there is shown therein an improved stacking apparatus in accordance with the present invention indicated generally at 10. Stacking apparatus 10 includes an infeed means 12 operative to receive formed articles 11 from the stripping means (not shown) and to direct these formed containers 11 onwardly through the remaining portions of the stacking apparatus 10. Adjacent the outlet end of the feed means are appropriate gate means 14 which operate in unison in order to supply the articles in timed sequence to the elevator means 16 positioned immediately following the feed means 12. The elevator means 16 operate to receive individual articles in timed sequence and to elevate the respective articles into a nested stacked relationship and to hold the stacked articles in overlying relationship to the receiving area thereof. Once a predetermined number of stacked articles has been accumulated, exit gate means as described in greater detail below open to allow the stack of nested articles to move outwardly under the force of gravity into a holding area 18 from which an operator may remove the stacked articles and place them in appropriate shipping cartons. Because each of the released stacks of articles contains a predetermined number, it is not necessary for the operator to count individual articles but merely necessary that the operator maintain a count of the number of stacks being placed in the shipping cartons. It should also be noted, however, that as long as the individual stacks contain a substantial number of containers, they will have a considerable height and thus eliminate the need for the operator to even maintain an accurate count of the number of stacks placed in the shipping container because the size of the shipping container itself will provide a limiting factor indicating whether or not the appropriate number of stacks has been packaged therein.

Figure 2:
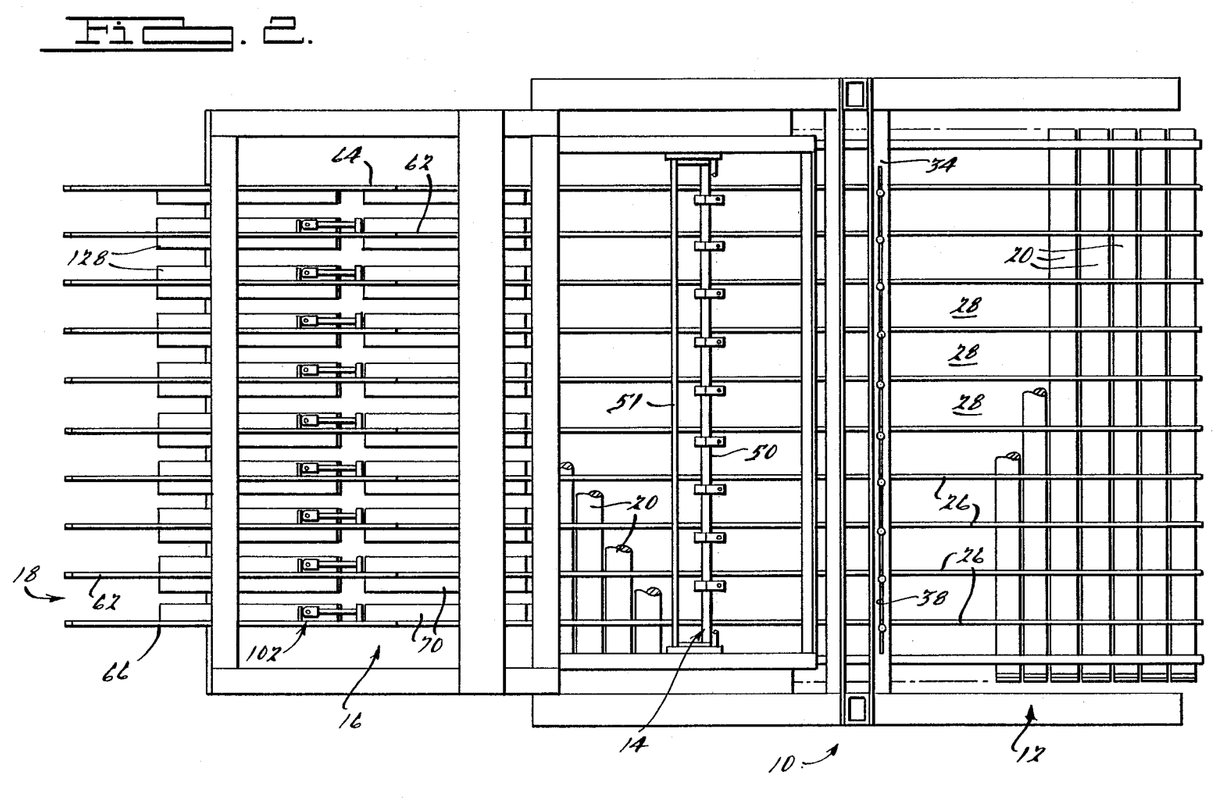
FIG. 2 is a plan view of the stacking apparatus illustrated in FIG. 1.

The infeed means 12, as best seen with reference to FIG. 2, comprises an elongated supporting platform defined by a plurality of substantially parallel, relatively small diameter laterally elongated rollers 20. Rollers 20 extend across the entire width of the machine in transverse relationship to the direction of movement of the individual articles 11 being received from the stripping apparatus and are all driven from a common drive shaft 22 positioned therebelow by a plurality of suitable belt drive means 24. Selected ones of the plurality of rollers 20 are directly driven by this drive shaft 22 and suitable belt means are provided extending between the directly driven rollers 20 and subsequent rollers 20 to thereby assure that substantially all of the individual rollers are being power driven so as to convey the individual articles along through the feed means 12. Preferably the length of feed means 12 will be slightly greater than necessary to accommodate the number of articles formed in a single operation of the forming machine so as to assure a sufficient feed holding area to avoid the possibility of inhibiting the exiting movement of the articles from the forming apparatus.

As previously mentioned, the individual articles are arranged in a plurality of substantially parallel, side-by-side rows as they are received from the forming and stripping apparatus. In order to maintain the articles in the appropriate rows as they are processed through the stacking apparatus 10 of the present invention, a plurality of substantially identical elongated guide rails 26 are positioned in generally spaced parallel relationship with each other and in overlying relationship to the rollers 20. Guide rails 26 will preferably have a length slightly greater than the overall length defined by rollers 20 so as to extend outwardly therefrom slightly at opposite ends. The number of guide rails 26 required will be sufficient to define a plurality of lanes 28 therebetween equal in number to the number of rows of forming cavities provided in the forming dies being used and will vary between runs of different sized articles.

In order to prevent the possibility of edge portions of the articles from slipping underneath the guide rails 26 during movement along the feed platform 12, the lower edges of each of the guide rails 26 are provided with a scalloped contour, each of the scallops 30 having a radius of curvature slightly greater than the radius of curvature of the individual rollers 20. Thus, when the guide rails 26 are positioned in overlying relationship to the infeed platform 12, the intervening portions 32 between the scallops 30 will interfit between the spaces provided between the individual rollers 20 thus projecting below the supporting surface defined by these rollers and thereby preventing the edge portions of the articles 11 from slipping underneath the guide rails 26 and possibly jamming further infeeding of the articles. Preferably, these guide rails 26 will be supported in suspended relationship by suitably positioned supporting structure 34 extending transversely across the infeed means. Suitable brackets 36 are provided for this purpose being fixedly secured to the individual guide rails 26 and extending upwardly therefrom and being suitably adjustably secured to the overlying support means 34 such as by means of threaded fasteners or the like. In order to facilitate rapid and convenient adjustment of these individual guide rails 26 to various spacings, the overlying support structure will be preferably provided with an elongated slot 38 extending along a substantial length of structure 34 for receiving the threaded fasteners operative to secure these brackets thereto. Thus, by merely loosening and sliding the individual guide rails into the desired spaced relationship, the feed portion 12 of the apparatus may be easily and quickly adjusted to accommodate changeover from one width of articles to the next.

Infeed gate means 14 are also provided intermediate the ends of the feed means 12 which gate means 14 operate to sequentially allow passage of individual articles to the elevator means 16 provided at the outflow end of the feed means 12. Preferably these gate means 14 will be adjustable so as to enable them to be positioned a predetermined distance from the terminal discharge end portion of the feed means 12, this predetermined distance being slightly greater than the length of the article being handled by the stacking apparatus 10. The infeed gate means 14 is supported for reciprocal movement in overlying relationship to the feed means platform 12 by means of suitable support structure 40 which allows for adjustment longitudinally of stacking apparatus 10 and comprises a pair of spaced substantially parallel plate members 42 and 44 each of which has an elongated vertically extending slot 46, 48 provided therein. An elongated shaft 50 extends therebetween and includes opposite end fittings 52 guidably received within respective slots 46, 48. A plurality of rods 54 are adjustably secured to shaft 50 by means of suitable clamps 56 and are equal in number to the number of individual lanes 28 being defined by the guide rail members 26. Each of the respective clamps 56 and rods 54 will be substantially identical and will project downwardly into the respective lanes 28 intermediate the guide rails 26 and operate to obstruct continued movement of respective articles along the feed rollers 20. In order to avoid possible damage to the containers, the lower terminal end of each of rods 54 is bent accurately toward an adjacent rail 26.

In order to reciprocate the rod members 54 in timed sequence, a suitable pneumatically operated piston 56 is provided which is secured to plate 44. The actuating rod of piston 56 is secured to a crank arm 58 having one end secured to a second shaft 51 extending between and rotatably supported by plates 42 and 44. A second crank arm substantially identical to crank arm 58 is also secured to shaft 51 immediately adjacent plate 42. The other end of the crank arms is provided with an inwardly extending slot 60 which is designed to receive and support shaft 50. Thus reciprocal movement of the air piston 56 will operate via crank arm 58 to repeatedly raise and lower the shaft 50 thereby effecting reciprocating vertical movement of the rods 54 into and out of position within the respective leans 28 so as to thereby allow successive ones of the articles to be moved along past this infeed gating arrangement to the elevator means 16.

In order to maintain an accurate count of the number of articles being moved into each stack, each lane 28 is provided with suitable counting means 61 preferably located immediately adjacent the entry to the elevator means 16. Such counter means may be of any suitable type including either tactile sensing or proximity sensing type although the nature of the formed articles which the present invention is contemplated to be used with lend themselves to proximity sensing. These counter means will operate to maintain a count of the number of articles fed to the elevator means 16 and hence stacked and to actuate suitable release means once a predetermined number of such articles has been so stacked as described in greater detail below.

Elevator means 16 are provided immediately adjacent the discharge end of the feed means 12 and comprise a plurality of relatively large size panel members 62 each of which is substantially identical in construction. The panel members 62 are positioned in substantial parallel, side-by-side spaced relationship and will define spaces equal in number to the number of lanes 28 defined by the guide means 26 provided on the feed means 12 and will be substantially aligned therewith. As best seen with reference to FIGS. 5 through 7, panel members 62 are irregularly shaped and with the exception of the two outermost panel members 64 and 66 have a pair of elevator assemblies 68 affixed thereto on opposite sides for reciprocal movement with respect thereto. Each of the elevator assemblies 68 is substantially identical and hence only a single such elevator assembly 68 will be described in detail. Each of the two outermost panel members 64 and 66 have only a single elevator assembly 68 on the inwardly facing side thereof which assembly is virtually identical to the other assemblies.

Figure 5:
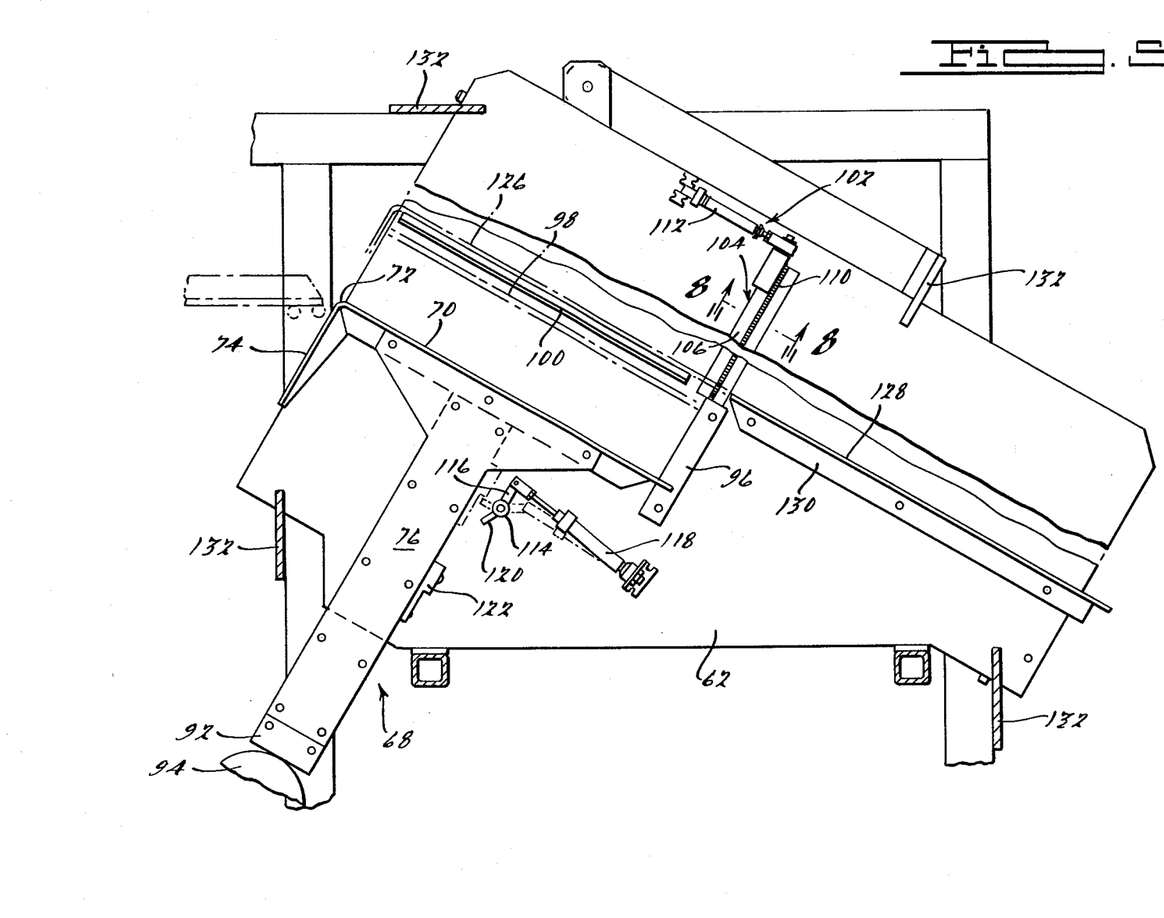
FIG. 5 is a fragmentary side elevational view of the elevator and exit gating portions of the stacking apparatus illustrated in FIG. 1.
Figures 6, 7, 8, 9:
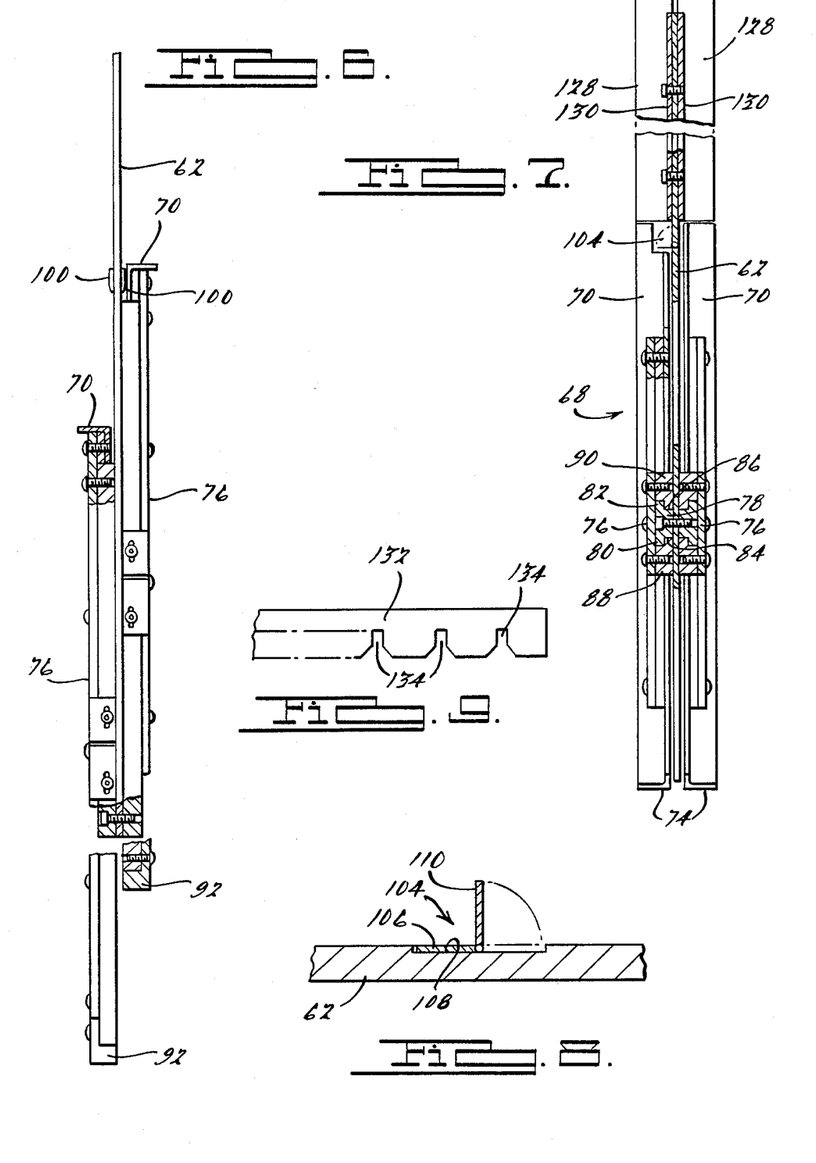
FIG. 6 is a fragmentary end view of one of the elevator panel members forming a part of the stacking apparatus illustrated in FIG. 1, portions thereof being broken away.
FIG. 7 is a bottom view of one of the elevator panels forming a part of the present invention illustrated in FIG. 1; portions thereof being shown in section.
FIG. 8 is an enlarged fragmentary section view of a portion of the panel member showing the exit gate illustrated in FIG. 5, the section being taken along line 8—8 thereof.
FIG. 9 is a plan view of a guide member for aiding in positioning of the respective panel members.
Figure 9:
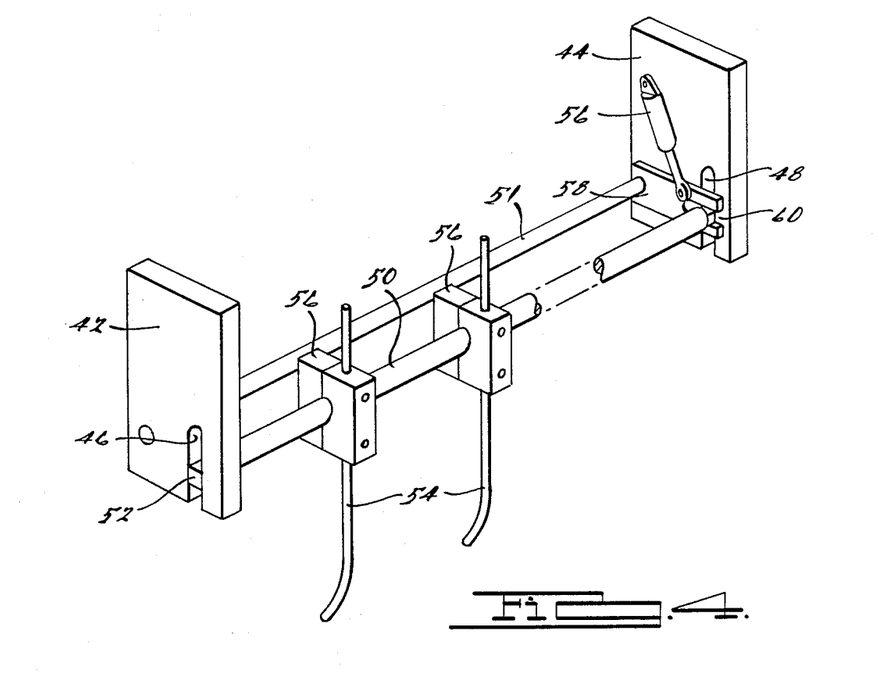

As best seen with reference to FIG. 5, each of the elevator assemblies 68 comprises an elongated upper rail member 70 having a relatively narrow width and extending at an inclined angle of preferably approximately 30 degrees with respect to the plane defined by the feed platform 12. A leading edge 72 of the rail member 70 is provided with a depending portion 74 of substantial length and operates to define an abutment surface to prevent entry of an article during the time period in which the elevator 68 is in a raised position. Thus, this depending flange portion 74 will have a length slightly greater than the maximum distance of vertical movement of the respective elevator member 68.

In order to reciprocably drive the elevator assembly 68, a depending bar member 76 extends downwardly from rail member 70 at substantially right angles to the rail member 70 and is provided with suitable guide means on the side facing panel member 62 so as to support the elevator member 68 and associated drive bar 76 for reciprocal movement. These guide means comprise an elongated generally T-shaped member 78 suitably secured to the panel member 62 and having a pair of oppositely extending arms 80, 82 provided thereon each of which cooperates with the panel member 62 to define a pair of guide channels 84, 86 therebetween. Secured to the drive bar member are a pair of substantially parallel elongated L-shaped bar members 88, 90, each having a leg portion projecting inwardly and adapted to be slidingly received within the respective guide channels 84, 86. The lower end portion 92 of the drive bar member 76 is designed to be suitable releasably connected to or otherwise engaging a common drive shaft 94 which drive shaft 94 will operate to reciprocate each of the individual elevator members 68 in unison. An elongated stop flange 96 is also secured to the panel member 62 immediately adjacent the rearmost portion of the rail member 70 and operates to provide an abutment portion to limit further movement of the respective articles once they have been received on the supporting surfaces of rail members 70 as well as during upward movement of the respective articles into stacked relationship with the overlying stack thereof.

During normal stacking movement of the rail member 70, the drive means will operate to reciprocate rail members 70 between a lowered position such as is illustrated in full lines in FIG. 5 and a raised position denoted by reference numeral 98 and shown in phantom in FIG. 5. It should be noted that when the rail member 70 is in the illustrated raised position 98, the stop flange 96 is still positioned so as to limit movement of the respective articles. In order to support the individual articles in an elevated stacked nested relationship during the lowering of the rail member 70, a suitable friction surface 100 is provided on the panel member 62 which frictional surface 100 operates to engage the edge portion of the respective articles and to maintain them in this elevated position without need for further support. Suitable frictional surfaces 100 may be any form of material having the ability to lightly engage and hold the edges of the articles so as to support same and yet durable enough to provide relatively long life thereto. Presently, it has been found that a strip of leather having a lower beveled edge has provided excellent results although other materials may also be used. As successive ones of the articles are moved upwardly into stacked nested relationship, the friction material will engage the edges of two or three such articles and operate to support the remaining articles which may be stacked thereabove.

Suitable exit gate means 102 are also provided on only one side of each of the panel members 62 and comprises an elongated piano hinge 104 secured to the panel member 62 and extending upwardly from the upper terminal end portion of the stop flange 96. As best seen with reference to FIG. 8, one leg 106 of the piano hinge is suitably secured within an appropriately machined recess 108 provided in the panel member 62 in such a manner as to place the outwardly facing surface thereof in substantially coplanar relationship with the outer surface of the panel member 62 and thus avoid the possibility of any restriction against subsequent movement of the stacked articles. Preferably this recess 108 will be of sufficient size so as to allow a space for receiving the other leg portion 110 of the piano hinge 104 upon releasing movement of this exit gate means 102. As individual articles are continuously moved into the stacked overlying relationship, the exit gate means 102 will be in a closed position with the second leg 110 of the piano hinge projecting outwardly at substantially right angles to the surface of the panel member 62. A suitable controlled air cylinder 112 is also provided in order to operate the piano hinge 104 between open and closed positions. Preferably only a single such exit gate means 102 will be provided on each panel 62 so as to thereby provide only a single actuating mechanism which must be operated in order to release the stacked containers into the holding area 18.

In order to accomplish this release operation, the elevator assembly 68 is provided with a crank arm 114 pivotably secured to panel 62 and having one leg 116 thereof connected to a suitably operated air cylinder 118 also secured to panel 62. The other leg 120 is designed to move into engagement with an abutment surface 122 provided on a portion of the drive member 76 when the drive member is in the elevated position 98 and to operate thereagainst to move the rail surfaces 70 upwardly an additional relatively small distance. This upward movement will move drive bar 76 upwardly and out of engagement with reciprocating drive shaft 94 thereby halting temporarily further reciprocating movement of elevator 68. This additional upward movement of the rail surfaces 70 will operate to raise the entire stack of articles upwardly beyond the frictional surfaces 100 provided on the panel members 62 thus freeing the entire stack for movement into the holding area 18. When the elevator 68 is in this further raised position as denoted in phantom by reference number 126, the upper surfaces of the rail member 70 will be in substantially coplanar relationship with supporting surfaces 128 provided by an elongated flange member 130 secured to the panel member 62. When air cylinder 112 opens gate 110, this elongated flange member 130 will provide a supporting surface for exiting movement of the stacked articles under the force of gravity downwardly into the holding area 18 from which an operator will then remove the stack and place it in the appropriate shipping container. Preferably the length of both the rail members 70 and flange member 130 will be substantially equal to the maximum length of articles which are being processed by the stacking equipment 10 so that each area may accommodate a stack of articles. This arrangement thus provides a second holding area in the event the holding area 18 is already occupied by a stack which has not yet been removed by the operator.

The panel members 62 are associated elevator assembly 68 are designed to be easily and conveniently positioned in any desired spacing in like manner with the relatively easy positioning of the guide means 26 provided on the infeed means 12. In order to accomplish this, a plurality of guide bars 132 are designed to be removably secured to the stacking apparatus with each of the guide bars having provided thereof a plurality of appropriately spaced slots 134 into which edge portions of the panel members 62 are designed to be received. As best seen with reference to FIG. 9, each of these guide bars 132 will comprise an elongated member having a plurality of suitably spaced side-by-side slots 134, each slot of which is designed to receive an edge portion of the panel member 62. In order to facilitate insertion of the panel member into the respective slots 134, the outer end thereof is beveled slightly so as to provide a guide surface therefor. Thus, by merely removing a previous set of guide bars 132 and securing a new set of guide bars 132 having the appropriately spaced slots, the individual panel members 62 may be easily repositioned in any desired spacing, the guide bar members 132 operating to greatly facilitate this changeover operation and to eliminate the need for any careful and precise measuring of the spacing between the respective panel members 62.

In operation, the formed articles will be received from the stripper mechanism (not shown) and transferred by means of the powered rollers 20 provided on the feed means 12 forwardly to the entry gate means 14. While the elevator members 68 are in a raised position, the gate rods 54 will open or raise thereby allowing each lane 28 to feed entire rows of articles forwardly until the leading edge of the forwardmost article abuts the surfaces 74 provided on the elevator means 68. These abutting surfaces 74 will prevent further movement of the respective articles until such time as the elevator member 68 moves downwardly into a lowered position at which time the respective articles will be driven forward under the force of the powered rollers 20 and move on to the supporting surfaces of the respective elevators 68. During this period of movement of the articles onto the supporting surface of the elevators 68, the remaining articles within each of the respective lanes 28 will be held against further advancement by means of rods 54 of entry gate means 14. The counter means will maintain an accurate count of the number of articles actually entering elevators 68 for each lane so as to trigger operation of exit gate 102 and air cylinder 118 in order to raise rail member 70 to position 126 and thereby release the predetermined number of stacked articles into the holding area.

Once the articles have moved onto the rail members 70, the elevator means 68 will be driven upwardly thereby carrying the respective articles up and moving them into a nested stacked relationship with the previously received articles. The fiber material 100 provided on each of the panel members 62 will operate to hold the stacked articles in this elevated position during the reciprocal movement of the elevator means 68. Once the counter means 61 has indicated that a given lane 28 has received and thus stacked a predetermined number of containers, the elevator means 68 associated with that particular lane will be disengaged from the drive means and the cylinder 118 and associated crank arm forming the additional lift mechanism will actuate to raise the elevator 68 into the maximum elevated position 126 thereby moving the stack of articles upwardly beyond the upper edge of the fiber material 100. While this additional lift mechanism maintains the elevator 68 in this maximum elevated position, the exit gate means 102 will be actuated thereby allowing the stack of articles to slide under the force of gravity outwardly down through and into the holding area 18. One the stack of articles has moved outwardly into the holding area 18, the exit gate means 102 will move into a closed position and the elevator 68 will be released for downward movement and will re-engage the lower drive means 94 and thus resume its reciprocal movement in unison with the remaining elevators. During this discharge operation, the depending abutment portion 74 provided on the elevator means 68 will continuously operate to restrict entry of any further articles in spite of the reciprocal movement of the entry gate means 14.

Figure 10:
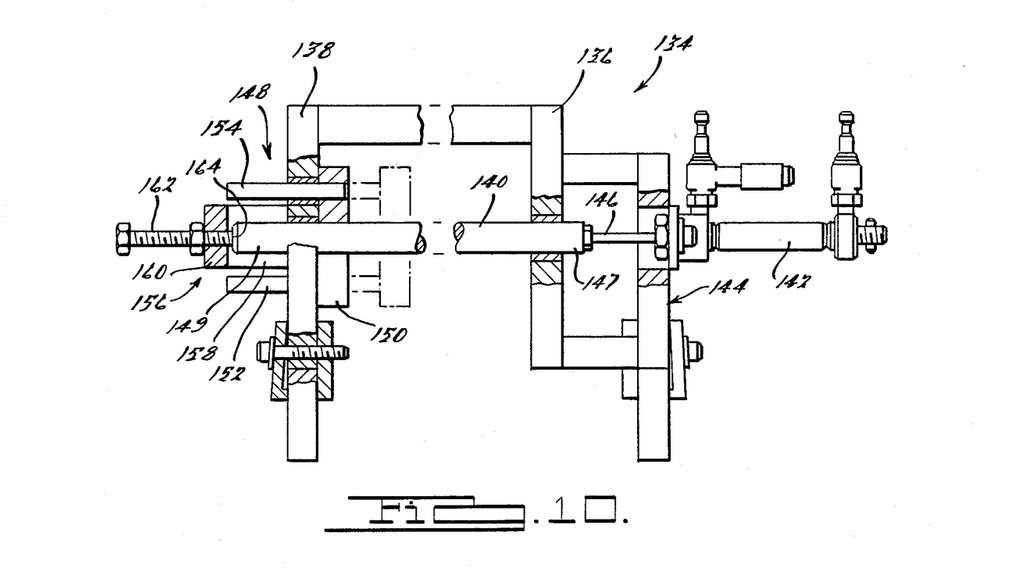
FIG. 10 is a view of an alternative arrangement for the entry gate all in accordance with the present invention.

Referring now to FIG. 10, there is shown an alternative embodiment 134 for the entry gate means 14 illustrated and described above. Entry gate means 134 comprises a pair of spaced end plate members 136, 138 longitudinally movably supported in a suitable manner on stacking apparatus 10 in a like manner as plate members 42 and 44 of entry gate means 14. An actuating rod 140 extends between and is longitudinally reciprocably supported by respective plate members 136, 138. A linearly actuatable double acting pneumatic cylinder 142 is securely attached to and supported on a stand off assembly 144. The piston rod 146 of cylinder 142 is suitably secured to one end 147 of actuating rod 140 so as to enable cylinder 142 to reciprocate rod 140 in a longitudinal direction.

In order to prevent relative rotational movement of rod 140, a guide assembly 148 is provided at the other end 149 thereof and comprises a bracket member 150 fixedly secured to rod 140 adjacent end 149 and inwardly of plate 138. A pair of guide rods 152, 154 are secured to opposite ends of bracket member 150 and project movably through suitable openings provided in plate 138.

In order to limit the longitudinal movement of rod 140, an adjustable stop assembly 156 is supportingly secured to plate 138 and comprises a pair of outwardly projecting spaced parallel brackets 158 and an interconnecting cross member 160 extending therebetween. A threaded bolt 162 is also provided being threadedly received within an opening in cross member 160 and extending inwardly therefrom so as to provide an inwardly projecting stop surface 164 engageable with end 149 of rod 140 so as to limit the movement thereof. A suitable cushion may be fitted to the end of either rod 140 or bolt 162 to somewhat lessen the shock loading thereon.

In use, depending rod members and associated clamps substantially identical to rods 54 and clamps 56 will be adjustably secured in spaced relationship along rod 140 and between brackets 136 and 138. These depending rod members will be positioned so as to be laterally reciprocated with respect to stacking apparatus 10 into and out of engagement with articles as they are being moved along through infeed means 12 and to elevator means 16. As these depending rods are moved into engagement with successive articles, the articles will be forced laterally into engagement with the adjacent guide rails 26 and held until the cylinder 142 operates to open the gate means 134 by moving the depending rods laterally (with respect to infeed means 12) out of engagement with the articles. Thus, an alternative gating arrangement is provided which may be then well suited for certain types of articles.

Thus, as may now be appreciated, the present invention provides a relatively simple, straightforward apparatus which may effectively be utilized to stack such thermally formed polymeric articles in quick succession and yet assure that each such stack contains the precise number of articles desired. This apparatus thus greatly facilitates the preparation of such articles for further shipment to the end user thereof. The unique design of this stacking apparatus allows it to be very readily and easily converted from production runs of one size articles to the next thus greatly reducing the downtime required during such a changeover operation as well as substantially reducing the cost of final packaging of these articles.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

We claim:

1. Apparatus for automatically stacking flexible formed polymeric articles comprising:

elevator means for receiving successive ones of said articles and moving said successive ones of said articles into a stacked nested relationship;

means for supporting said stacked articles in overlying relationship to said elevator means;

entry gate means for selectively delivering said successive ones of said articles to said elevator means;

a plurality of panel members positioned in side-by-side substantially parallel spaced relationship to thereby define in part a plurality of lanes, each of said panel members having movably secured thereto at least one of said elevator means;

release gate means for releasing said stacked articles in response to a predetermined number of said articles being moved into said stacked relationship;

means for moving selected ones of said elevator means to a position wherein said selected ones of said elevator means is operative to move said predetermined number of stacked articles out of engagement with said supporting means; and counter means associated with each lane for counting articles being supplied to respective ones of said elevator means, said counter means being operative to actuate said release gate means upon delivery of a predetermined number of articles to said supporting means whereby said stacked articles are moved into a holding area associated with said apparatus.

2. The apparatus as set forth in claim 1 further comprising entry feed means for delivery said articles to said entry gate means and transporting and articles to said elevator means.

3. The apparatus as set forth in claim 1 wherein said elevator means includes a surface for supporting said articles, said elevator means surface being inclined from a true horizontal plane whereby movement of said articles onto said surface is aided by gravity.

4. The apparatus as set forth in claim 2 wherein said feed means include means defining a plurality of feed lanes, each feed lane being operative to deliver said articles to respective ones of a plurality of elevator means.

5. An apparatus for automatically stacking flexible formed polymeric articles comprising:

feed means for receiving said formed articles from forming means, said formed articles being arranged in a plurality of substantially parallel side-by-side rows, each of said rows having a plurality of said formed articles and said feed means being operative to maintain said formed articles in said parallel rows;

elevator means associated with each of said rows and movable between first and second positions, said elevator means being operative when in said first position to receive said formed articles from said feed means and movable to said second position to move successive ones of said formed articles into a semi-nested stacked relationship with preceding ones of said formed articles; and independently operable release gate means associated with each of said rows, said release gate means being operative to initially retain said formed articles in stacked relationship until said elevator means has stacked a predetermined number of said articles and to thereafter release said stacked formed articles thereby enabling said stack to move into a holding area for final packing;

said elevator means being selectively movable to a supporting position wherein said elevator means operates to support said stacked formed articles during said movement into a holding area.

6. The apparatus as set forth in claim 5 further comprising guide bar means secured to said apparatus, said guide bar means being operative to aid in positioning of said elevator means in alignment with said rows supplied from said feed means.

7. The apparatus as set forth in claim 5 wherein said feed means incorporate elongate guide rails operative to maintain said articles in said formed rows.

8. The apparatus as set forth in claim 7 wherein said guide rails are adjustably supported on said apparatus so as to enable said apparatus to accommodate articles of different widths.

9. An apparatus for automatically stacking flexible formed polymeric articles comprising:

a feed assembly comprising a plurality of elongated power driven rollers positioned in substantially parallel closely spaced relationship for conveying said articles therealong;

elongated guide rails positioned in substantially parallel spaced overlying transverse relationship to said power rollers, said guide rails defining a plurality of lanes for guiding movement of said articles along said rollers;

first entry gate means positioned in overlying relationship to said rollers intermediate the ends of said feed assembly, said gate means including restricting means reciprocably movable into and out of a position whereby further movement of said articles along said rollers is prevented;

a plurality of panel members positioned in substantially parallel spaced relationship at one end of said feed assembly, said panel members being positioned in aligned relationship with said guide rails;

friction means provided on said panel members for engageably supporting said articles in a first elevated position;

a plurality of elevators reciprocably movably secured to said panel members, said elevators including a surface for supportingly receiving said articles from said feed assembly and elevating successive ones of said articles into said first elevated position whereby said articles are stacked in a nested relationship;

counter means associated with each of said lanes for counting the number of articles supplied to each of said plurality of elevators; and release means for effecting movement of said stack articles from said first elevated position into a holding area in response to a signal from said counter means that a predetermined number of articles has been stacked.

10. The apparatus as set forth in claim 9 wherein said plurality of elevator means are driven by a common drive means.

11. The apparatus as set forth in claim 10 wherein said release means include a second gate means for each of said lanes movable between open and closed positions.

12. The apparatus as set forth in claim 11 wherein said second gate means are mounted on each of said panel members.

13. The apparatus as set forth in claim 11 wherein said release means further comprises means to move respective ones of said elevator means out of engagement with said drive means and into a second elevated position.

14. The apparatus as set forth in claim 13 wherein said second elevated position is located above said first elevated position.

15. The apparatus as set forth in claim 9 wherein said supporting surface of said elevator means is inclined with respect to a plane defined by said rollers whereby movement of said articles onto said surfaces is aided by gravity.

16. The apparatus as set forth in claim 15 wherein said panel members include a pair of elevators movably secured to opposite sides thereof.

17. The apparatus as set forth in claim 9 wherein said guide rails are laterally adjustably supported in overlying relationship to said rollers so as to enable said stacking apparatus to accommodate articles of different widths.

18. The apparatus as set forth in claim 17 wherein said panel members are adjustably supported at said one end of said feed means whereby said stacking apparatus may be adjusted to accommodate articles of different widths.

19. The apparatus as set forth in claim 18 further comprising adjustment guide means operative to facilitate repositioning of said panel members.

20. The apparatus as set forth in claim 19 wherein said adjustment guide means comprise an elongated bar having a plurality of slots therein, respective ones of said panels being received within respective ones of said slots.

21. The apparatus as set forth in claim 9 wherein each of said lanes includes at least one elevator, each of said elevators being reciprocably driven in unison by a common drive means.

22. The apparatus as set forth in claim 21 wherein said release means includes means to release respective ones of said elevators from said common drive means.

* * * * *

UNITED STATES PATENT AND TRADEMARK OFFICE
CERTIFICATE OF CORRECTION

PATENT NO. : 4,834,606

DATED : May 30, 1989

INVENTOR(S) : Thomas M. Burns and David Ryan

It is certified that error appears in the above-identified patent and that said Letters Patent is hereby corrected as shown below:

Column 5, line 32, "leans" should be --lanes--.

Column 6, line 33, "suitable" should be --suitably--.

Column 7, line 25, "suitable" should be --suitably--.

Column 8, line 3, "are" should be --and--.

Column 8, line 6, "positioning" should be --repositioning--.

Column 8, line 10, "thereof" should be --thereon--.

Column 8, line 52, "member" should be --members--.

UNITED STATES PATENT AND TRADEMARK OFFICE
CERTIFICATE OF CORRECTION

PATENT NO. : 4,834,606

DATED : May 30, 1989

INVENTOR(S) : Thomas M. Burns and David Ryan

It is certified that error appears in the above-identified patent and that said Letters Patent is hereby corrected as shown below:

Column 9, line 8, "One" should be --Once--.

Column 10, line 56, Claim 2, "delivery" should be --delivering--.

Column 10, line 57, Claim 2 (second occurrence) "and" (second occurrence in patent) should be --said--.

Signed and Sealed this

Twenty-fourth Day of April, 1990

Attest:

HARRY F. MANBECK, JR.

*Attesting Officer*  *Commissioner of Patents and Trademarks*